(12) United States Patent
Schwartz et al.

(10) Patent No.: US 9,990,100 B2
(45) Date of Patent: Jun. 5, 2018

(54) PROVIDING AUTOMATION CODE CONTAINING A REPRESENTATION OF ALTERNATIVE INTERPRETATIONS OF A USER ACTION

(75) Inventors: Dror Schwartz, Holon (IL); Amir Kessner, Ramat-Gan (IL); Ithai Levi, Hod-Hasharon (IL); Moshe Eran Kraus, Mazkeret Batya (IL); Eyal Kobrigo, Yahud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 997 days.

(21) Appl. No.: 13/812,600

(22) PCT Filed: Aug. 17, 2010

(86) PCT No.: PCT/US2010/045742
§ 371 (c)(1),
(2), (4) Date: Jan. 28, 2013

(87) PCT Pub. No.: WO2012/023928
PCT Pub. Date: Feb. 23, 2012

(65) Prior Publication Data
US 2013/0145264 A1  Jun. 6, 2013

(51) Int. Cl.
G06F 11/34 (2006.01)
G06F 3/048 (2013.01)
G06F 3/0484 (2013.01)
G06F 11/263 (2006.01)

(52) U.S. Cl.
CPC ............ *G06F 3/048* (2013.01); *G06F 3/0484* (2013.01); *G06F 11/263* (2013.01); *G06F 11/3414* (2013.01); *G06F 11/3438* (2013.01)

(58) Field of Classification Search
CPC .. G06F 3/048; G06F 11/3414; G06F 11/3688; G06F 11/3684; G06F 11/3438; G06F 11/3696; H04L 67/22
USPC ...... 715/704, 762, 764; 714/E11.2, E11.193, 714/E11.207, E11.208, E11.211, E11.217
See application file for complete search history.

(56) References Cited

U.S. PATENT DOCUMENTS

| | | | |
|---|---|---|---|
| 2001/0011370 A1 | 8/2001 | Gunter et al. | |
| 2003/0126517 A1 | 7/2003 | Givoni et al. | |
| 2004/0221242 A1* | 11/2004 | Chen et al. | 715/810 |
| 2005/0021289 A1 | 1/2005 | Robertson et al. | |
| 2005/0278728 A1* | 12/2005 | Klementiev | 719/328 |
| 2006/0253742 A1* | 11/2006 | Elenburg et al. | 714/38 |
| 2008/0010537 A1 | 1/2008 | Hayutin et al. | |
| 2008/0072100 A1 | 3/2008 | Okada | |

FOREIGN PATENT DOCUMENTS

| | | |
|---|---|---|
| CN | 1520574 | 8/2004 |
| KR | 20100062821 A | 6/2010 |
| WO | WO-2009108203 | 9/2009 |

OTHER PUBLICATIONS

Automating Test Automation (Suresh Thummalapenta, Saurabh Sinha, Nimit Singhania, and Satish Chandra) published in 2012 by BM T. J. Watson Research Center).*

(Continued)

*Primary Examiner* — Rinna Yi

(57) ABSTRACT

A representation of plural alternative interpretations of a user action is provided. Automation code containing the representation is executable to replay the user action.

19 Claims, 6 Drawing Sheets

OTHER PUBLICATIONS

Apfelbaum L: "Spec-based tests make sure telecom software works", IEEE Spectrum, IEEE Inc. New York, US, vol. 34, No. 11, Nov. 11, 1997, pp. 77-83, XP002149691.

European Patent Office, Extended European Search Report, dated Mar. 12, 2014, 11 pages, Munich, Germany.

Korea Intellectual Property Office, International Search Report, dated Apr. 25, 2011, 3 pages, Daejeon, Repoblic of Korea.

* cited by examiner

PROVIDING AUTOMATION CODE CONTAINING A REPRESENTATION OF ALTERNATIVE INTERPRETATIONS OF A USER ACTION

CROSS-REFERENCE TO RELATED APPLICATION

This application is a national stage application under 35 U.S.C. § 371 of PCT/US2010/045742, filed Aug. 17, 2010.

BACKGROUND

User actions (such as user selections made in a user interface) during use of a system can be captured and represented with automation scripts. Such automation scripts can be executed to replay the respective user actions. Executing such automation scripts to replay user actions can be made for various purposes, such as to test a system, or for other purposes.

BRIEF DESCRIPTION OF THE DRAWINGS

Some embodiments are described with respect to the following figures.

DETAILED DESCRIPTION

In some cases, it may be desirable to convert user actions into automation scripts that can be executed for replaying the user actions. For example, execution of such automation scripts can provide replaying of user actions to perform load testing of a system or to otherwise observe the behavior of the system under typical or expected use of the system. The system can be connected to client devices of various users. In specific examples, the system can be a web-based system, and the client devices can include browsers to access the web-based system. Load testing involves replaying the user actions that typically occur (or are expected to occur) to determine whether the web-based system can handle the typical or expected load. Other example uses of executing automation scripts to replay user actions include functional testing of a system (to identify possible faults or errors in the system), testing of security features of a system (to determine whether there are any security holes in the system), and/or for other purposes.

An issue associated with generating automation scripts to represent user actions is that a particular user action can be capable of multiple alternative interpretations. For example, a user action can involve the clicking of a checkbox in a graphical user interface to select (or activate) an option. One possible interpretation of clicking on the checkbox can be that the user desires to activate the option. However, another possible alternative interpretation of a user action is that the user simply desires to toggle the checkbox, namely, the user desires to transition from an activated state of the option to an inactive state of the option, or vice versa.

If an automation script captures an incorrect interpretation of a particular user action, then the automation script when executed would not reflect the correct user action. This may result in producing inaccurate results when the automation script is executed to replay the user action.

In accordance with some embodiments, systems or techniques are provided to identify and represent multiple alternative interpretations of a particular user action that is made by the user in a user interface (e.g., a graphical user interface or GUI). These multiple alternative interpretations of the particular user action can be represented in a representation that contains information regarding the multiple alternative interpretations. In some implementations, the representation is in the form of a switchable container, where the switchable container allows for easy switching between the multiple alternative representations. The switching between the multiple alternative interpretations can be performed manually, such as through a user interface, in some examples.

Figure 1:
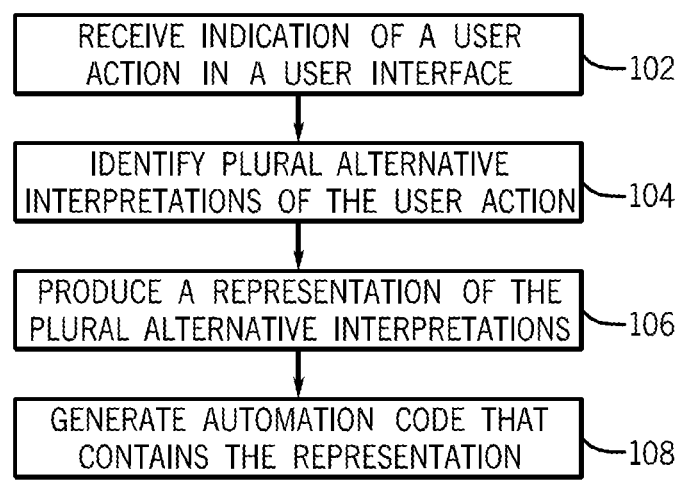
FIG. 1 is a flow diagram of a process according to some embodiments.

FIG. 1 is a flow diagram of a process according to some embodiments. A system receives (at 102) an indication of a user action in a user interface, where the user interface can be a graphical user interface (GUI) having control items that are selectable by a user using user interface devices, such as a mouse (or other pointing device), a keyboard, and/or a touchpad or touchscreen.

The system identifies (at 104) multiple alternative interpretations of the user action. The system then produces (at 106) a representation of the multiple alternative interpretations. As noted above, in some implementations, the representation can be in the form of a switchable container. In specific examples, the switchable container is a manipulatable model that can be in an Extensible Markup Language (XML) format, or in some other type of format.

The system then generates (at 108) automation code that contains the representation, where the automation code is executable to replay the user action. In some implementations, the automation code is in the form of an automation script.

A "script" contains machine-readable code that can be interpreted by a system (note that a script does not have to be first compiled). In other implementations, the automation code can be in other forms of machine-readable instructions that are executable by a system having a processor. Such other forms of machine-readable instructions can include code that is first compiled before execution.

In accordance with some implementations, the representation of the multiple alternative interpretations contains information indicating which of the multiple alternative interpretations is an active alternative interpretation, and which of the other multiple alternative interpretation(s) is (are) inactive alternative interpretations. During execution of the automation code, just the active alternative interpretation is exposed in the system that executes the automation code. "Exposing" the active alternative interpretation means that the active multiple interpretation is the user action that is replayed by execution of the automation code. The inactive alternative interpretation(s) contained in the switchable container is (are) not replayed during execution of the automation code.

In accordance with some implementations, it is possible to switch to a different one of the multiple alternative interpretations as being the active alternative interpretation. For example, a user may decide to mark another of the multiple alternative representations as being the active alternative interpretation. This change can be made as part of an automation code editing process using a user interface presented to the user, where the user interface can list the multiple alternative interpretations that are represented by the switchable container. The user interface can highlight the active alternative interpretation, and the user interface allows the user to mark a different one of the alternative interpretations as being the active alternative interpretations. The change of active alternative representation is stored in the switchable container, and the automation code containing the switchable container can then be re-executed using the different active alternative interpretation to replay a different interpretation of the user action.

Figure 2:
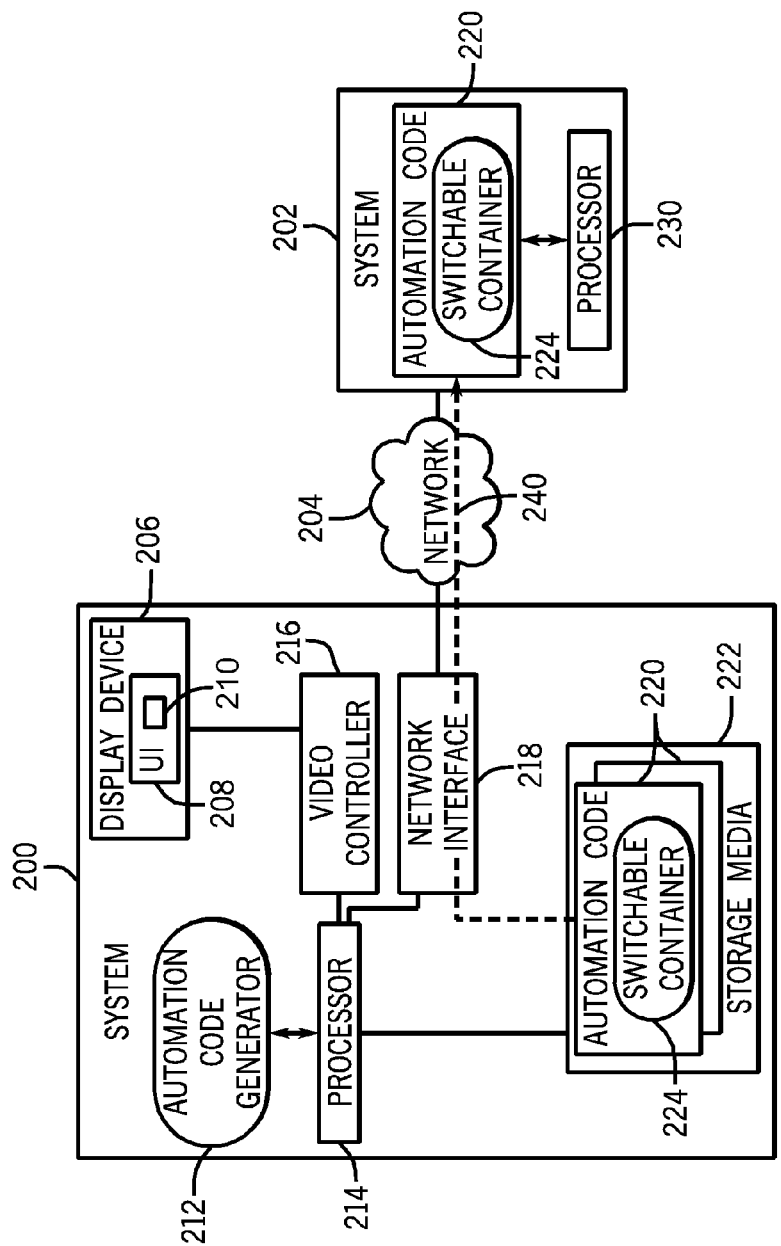
FIG. 2 is a block diagram of an arrangement incorporating some embodiments.

FIG. 2 is a block diagram of an example arrangement incorporating some embodiments. The arrangement of FIG. 2 includes a system 200 and a system 202 that are connected over a network 204. In alternative implementations, there can just be one system, such as the system 200, with the system 202 omitted. Examples of the systems 200 and 202 include computers or other electronic devices, such as personal digital assistants, electronic appliances, and so forth.

The system 200 has a display device 206 for displaying a user interface 208 (e.g., a GUI). The user interface 208 has a user-selectable control element 210, and a user action can be made with respect to the control element 210. This user action can be captured by an automation code generator 212 during a recording session of user actions. A user action made in the user interface 208 displayed by the display device 206 is communicated to the automation code generator 212, which records the user action. Multiple user actions made in the user interface 208 can be recorded by the automation code generator 212.

The automation code generator 112 is executable on a processor (or multiple processors) 214. The processor(s) 214 is (are) connected to a video controller 216 and a network interface 218. The video controller 216 is coupled to the display device 206 for presenting video images (including the user interface 208 and other images) on the display device 206. The network interface 218 allows the system 200 to communicate over the network 204.

For each group of one or multiple user actions recorded by the automation code generator 212, a corresponding automation code 220 can be produced by the automation code generator 212. The group of user action(s) represented by a corresponding automation code 220 can be a sequence of user actions, or just one user action, for example.

Each automation code 220 can be stored in storage media 222 of the system 200. As depicted in FIG. 2, each automation code 220 contains a switchable container 224 (or multiple switchable containers 224 if appropriate), where the switchable container 224 contains information relating to a corresponding captured user action. For a user action that is capable of multiple alternative interpretations, the corresponding switchable container 224 contains a representation of each of the multiple alternative interpretations. Note that in some cases, a user action is capable of just one possible interpretation, in which case the automation code 220 would contain just information relating to that one possible interpretation.

The automation code 220 stored in the storage media 222 is capable of execution to replay the corresponding user action. For a user action that is capable of multiple alternative interpretations as reflected by the corresponding switchable container 124, the replayed user action is according to the alternative interpretation that is marked active.

The automation code 220 can be executed in the system 200, or alternatively, the automation code 220 can be communicated (see arrow 240) over the network 204 to the system 202 for execution on one or multiple processors 230 of the system 202.

In some examples, the system 200 can be a client device at which users can make various selections or command actions that are captured by the automation code generator 212 of the client device during a recording session. The automation code generator 212 of each client device can then produce automation code 220 that is sent to a different system, such as system 202, for execution. For example, the system 202 can be a test system designed to perform testing of a system-under-test using the automation code 220.

In alternative implementations, the system 200 is a server system that is connected to multiple client devices. User actions made at the client devices can be captured by the automation code generator 212 in the server system 200. In such implementations, the automation code 220 that is generated by the server system 200 does not have to be communicated to a different system for execution. Instead, the automation code 220 can be executed on the system 200 itself.

An abstract representation of reported user actions according to one example is provided below:

```
{ Recorded step A with no alternatives }
{ Recorded Step B with no alternatives }
{ Recorded Step C with alternatives:
    <!--[if !supportLists]-->i. <!--[endif]-->Step C1 - marked as the "active"
    switchable container
    <!--[if !supportLists]-->ii. <!--[endif]-->Step C2
    <!--[if !supportLists]-->iii. <!--[endif]-->Step C3 }
```

In the example above, there are three user actions, represented as Step A, Step B, and Step C. Steps A and B do not have alternative interpretations in the example above, whereas Step C has three possible alternative interpretations, represented as C1, C2, and C3. In the example above, alternative interpretation C1 is marked as the active interpretation.

In some implementations, to identify alternative interpretations of a particular user action, a role-based approach can be used. For a given object (such as a checkbox in a user interface that can be selected/unselected by a user, or a slider in a user interface that can be moved to change values of a parameter), roles can be assigned by observing types and behaviors. More than one role is allowed for the same object or object pattern. For an example of such observation and classification, if a dragged/dropped element moves only horizontally or only vertically (only one of its x/y coordinates changes), and a value of a nearby text field changes accordingly, then the object pattern that includes the moved element and the associated text field can be classified as a slider. Different roles assigned to a particular object can be used for deriving the alternative interpretations of a particular user action.

The automation code generator 212 is able to identify which of the multiple alternative interpretations associated with a user action is more likely to reflect an intention of a user in performing the user action. The identification of the alternative interpretation that is more likely to reflect an intention of the user in performing the user action can be based on predefined rules, where the predefined rules can include heuristics based on past experience contained in historical data. Using the predefined rules, the automation code generator 212 is able to rank the multiple alternative interpretations in order of likelihood that corresponding ones of the multiple alternative interpretations reflect the intention of the user in performing the corresponding user action. Ranking the multiple alternative interpretations allows for the multiple alternative interpretations to be listed in the rank order so that a user is made aware of such ranking, which can allow the user to make a more intelligent selection of an active alternative interpretation should the user decide to switch between active alternative interpretations for a particular user action.

Figure 3A:
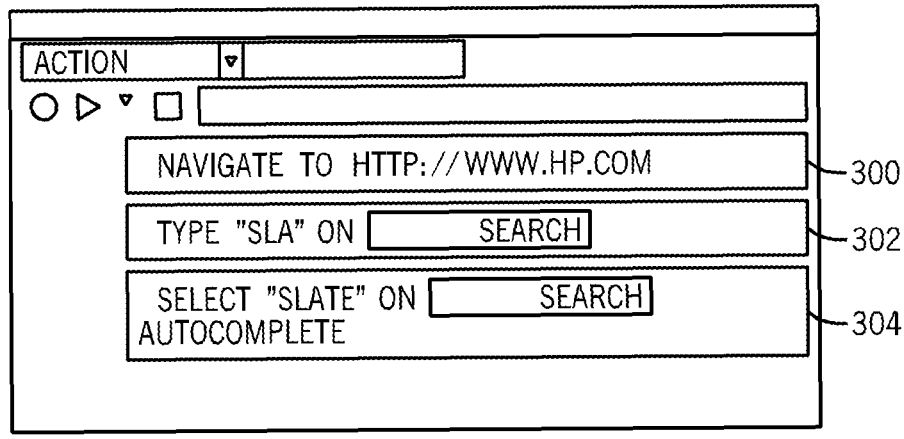
FIGS. 3A-3C, 4, and 5A-5B are graphical views of various examples useable with some embodiments.
Figure 3B:
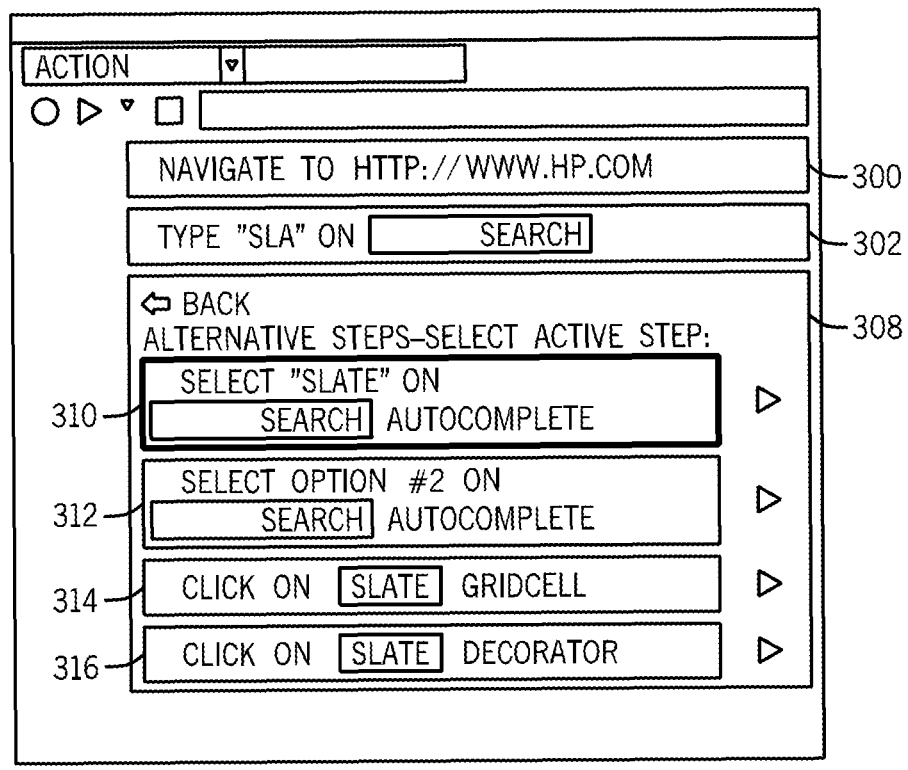
Figure 3C:
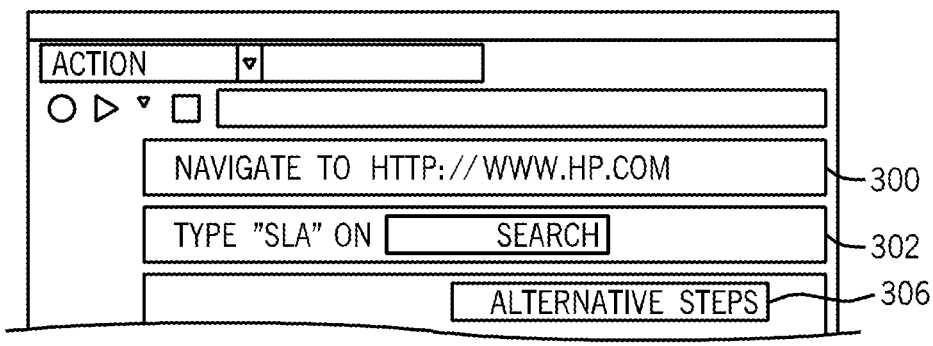
Figure 4:
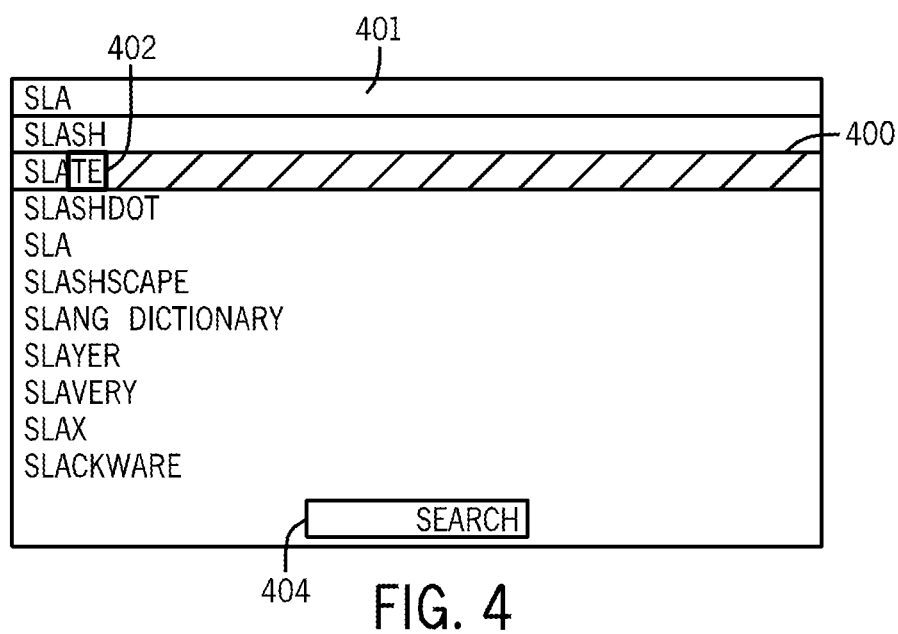

FIGS. 3A-3C depict example user interface screens for representing user actions. The user interface screens of FIGS. 3A-3C can be produced by a system according to some implementations to allow a user to view (and possibly edit) a collection of user actions, and any alternative interpretations associated with any of the user actions. In the example of FIG. 3A, a first user action (300) involves user navigation to a particular website, such as by a user typing in the corresponding URL (uniform resource locator) or clicking on a website link. A second user action (302) represents typing a character string "Sla" in a search box of the user interface presented by the website. In the particular example, it is assumed that upon typing the character string "Sla", an autocompletion feature is provided in which a list of possible words beginning with "Sla" is listed. A list of possible words autocompleted based on typing of "Sla" is presented in FIG. 4, which shows a user typing in "Sla" in text box 401. FIG. 4 also shows a "Search" box 404 selectable by a user to cause performance of a search based on the selected text by a search engine.

It is assumed that the word selected by a user is "Slate", as reflected by the highlighting (400) in FIG. 4. In FIG. 3A, selection of "Slate" by the user is depicted as a third user action (304). The selection of the word "Slate" from among the possible list of words shown in FIG. 4 can be the subject of multiple alternative interpretations. A first alternative interpretation is that the user intended to select the word "Slate," which is the interpretation reflected by third user action (304) in FIG. 3A. A second alternative interpretation is that the user intended to select the second entry of the list shown in FIG. 4. A third alternative interpretation is that the user intended to click on the "Slate" grid cell, which is an object that is part of an HTML (Hypertext Markup Language) table used for representing the list of FIG. 4. Yet another possible alternative interpretation is that the user clicked on the "te" decorator, as indicated by 402 in FIG. 4. A "decorator" refers to a user interface object that is highlighted in some way, such as when bolded, italicized, underlined, and so forth. The "te" decorator 402 in FIG. 4 is one example of such a highlighted user interface object that can be selected by a user to complete "Sla" typed into the search box 401 of FIG. 4.

The four possible alternative interpretations are depicted in box 308 in the user interface screen depicted in FIG. 3B. The active alternative interpretation (310), which in this example is the selection of the word "Slate", is visually highlighted (such as by use of a bolded block in FIG. 3B or by some other indicator, such as flag, text, and so forth). The other inactive alternative representations 312, 314, and 316 correspond to selection of the second entry in the autocompletion list, selection of a gridcell, and selection of a decorator, respectively.

If desired, the user can select a different one of the alternative interpretations (one of interpretations 312, 314, and 316) to be the active interpretation. The user can accomplish the selection of a different active interpretation of a user action by selecting in the block corresponding to the desired alternative interpretation, for example. Other techniques of changing active alternative interpretations can be used in other implementations. The ability to change active interpretations of a user action is part of an automation code editing mechanism provided to the user.

FIG. 3C shows the user interface screen with a selectable control element 306 (labeled "Alternative steps"). The "Alternative steps" control element 306 when activated or clicked on by a user causes the depiction of the multiple alternative interpretations (310, 312, 314, 316) in the box 308 of FIG. 3B.

Figure 5A:
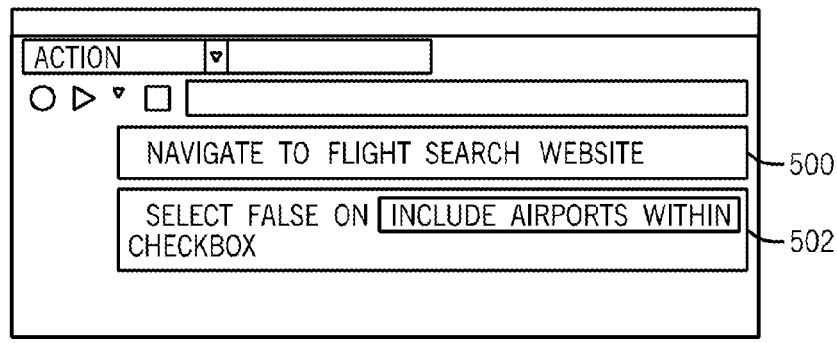
Figure 5B:
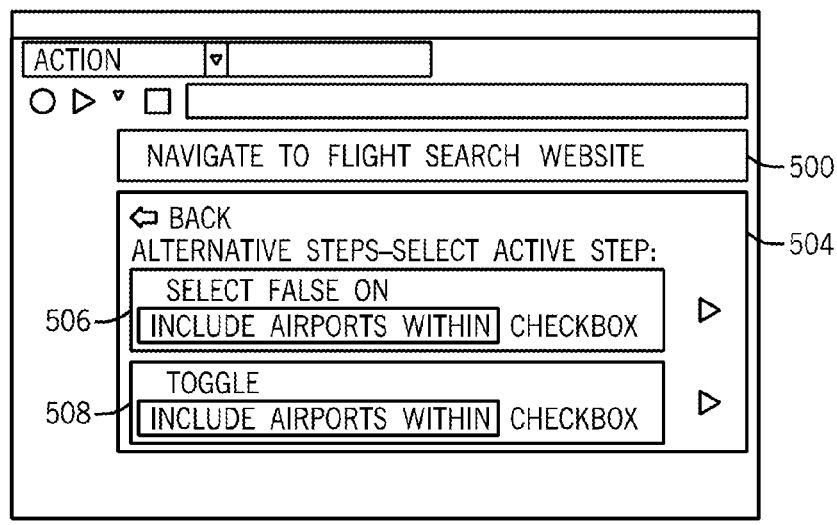

FIGS. 5A and 5B depict user interface screens for different example user actions. A first user action (500) in FIG. 5A represents user navigation to a particular flight search website. In a web page presented by the flight search website, an "include airports within" checkbox is displayed, which a user can select/deselect to specify a flight search that includes airports within a specified distance of the target airport. In the specific example of FIG. 5A, a second user action (502) involves the user selecting false in the "include airports within" checkbox.

If the user so desires, the user can cause the user interface to depict the multiple alternative interpretations for the select "false" action in the "include airports within" checkbox, as shown in the user interface screen of FIG. 5B. The multiple alternative interpretations are presented in a box 504, where the active alternative interpretation is the interpretation (506) that indicates that the user intended to select false in the checkbox. This active interpretation is visually highlighted (such as with a bolded block or with another indicator) to indicate that the interpretation is the active interpretation. The inactive alternative interpretation is the interpretation (508) in which the user intended to toggle the checkbox.

As with the example of FIG. 3B, a user can also switch between active interpretations in the example of FIG. 5B, such as by selecting a different one of the blocks in box 504.

Although FIGS. 3A-3C and 5A-5B show example user interface screens, it is noted that there are other user interface screens that depict other example user actions.

Figure 6:
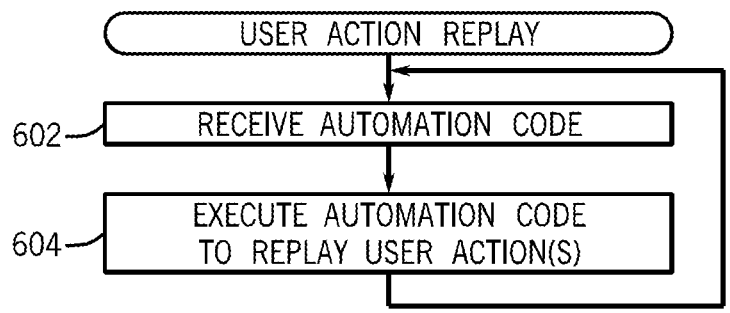
FIG. 6 is a flow diagram of a user action replay process according to some embodiments.

FIG. 6 is a flow diagram of a process of executing an automation code to replay user action(s) according to some implementations. An automation code is received (at 602), such as either the system 200 or the system 202 of FIG. 1. The received automation code has a representation (e.g., switchable container 224 in the example of FIG. 2) that contains plural alternative interpretations of a particular user action made in a user interface. One of the multiple alternative interpretations is marked as active, while another one of the multiple alternative interpretations is marked as inactive.

The automation code is executed (at 604) to replay the user action(s). For a particular user action that has multiple alternative interpretations, the particular user action replayed is based on the marked, active alternative interpretation. The process of FIG. 6 can be re-iterated as additional automation code is received.

Figure 7:
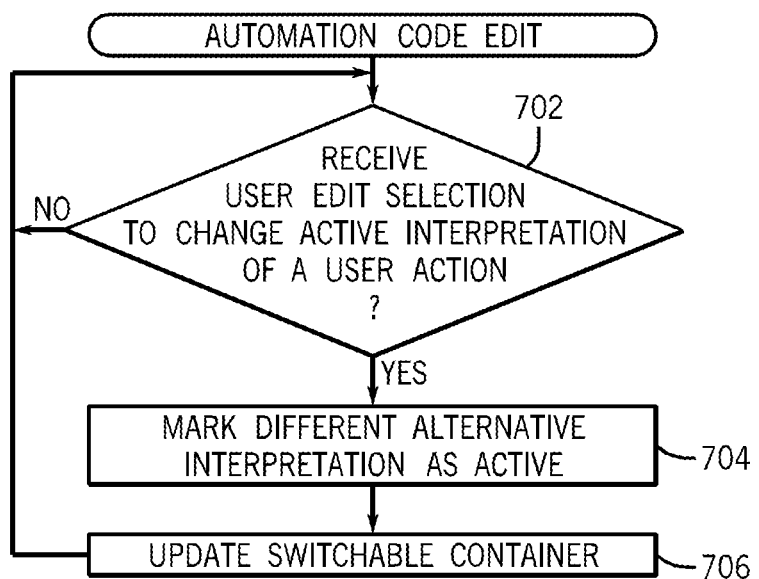
FIG. 7 is a flow diagram of an automation code editing process according to some embodiments.

FIG. 7 is a flow diagram of a process of performing automation code editing according to some implementations. The process of FIG. 7 determines (at 702) whether a user edit selection has been received to change active interpretation of a particular user action having multiple alternative interpretations. If so, the system marks (at 704) a different one of the multiple alternative interpretations as active. The change to a different active alternative interpretation is updated (at 706) in the switchable container (e.g., 224 in FIG. 2). The process of FIG. 7 can be re-iterated in response to other user selections to change an active interpretation of a user action.

The automation code with the updated switchable container can then be re-executed, such as according to FIG. 6, to replay the user action using the different active alternative interpretation.

By using techniques or mechanisms according to some implementations, improved flexibility is provided for capturing and replaying user actions. The capturing and replaying of user actions can be performed with reduced user intervention in specifying the correct interpretation of each user action. Moreover, flexibility is enhanced by providing the ability to change active interpretations of a particular user action.

The automation code generator 212 and automation code 220 of FIG. 2 can be implemented with machine-readable instructions loaded for execution on corresponding processor(s) 214 and/or 230. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a system having a processor, an indication of a particular user action made in a user interface during a recording session;
   identifying, by the system, plural alternative interpretations of the particular user action; producing, by the system, a representation of the plural alternative interpretations of the particular user action;
   generating, by the system, automation code that contains the representation, wherein the automation code is executable to replay the particular user action;
   marking, in the representation, one of the plural alternative interpretations of the particular user action as an active alternative interpretation, and another of the plural alternative interpretations of the particular user action as an inactive alternative interpretation; and
   presenting, in the user interface, the plural alternative interpretations, wherein the active alternative interpretation is indicated as being the active alternative interpretation in the user interface.

2. The method of claim 1, further comprising:
   executing the automation code to replay the user action using a selected one of the plural alternative interpretations of the particular user action.

3. The method of claim 2,
   wherein the selected alternative interpretation is the active alternative interpretation, and
   wherein upon executing the automation code the active alternative interpretation is exposed but the inactive alternative interpretation is not exposed.

4. The method of claim 1, further comprising:
   receiving, through the user interface, a user indication of a different one of the plural alternative interpretations of the particular user action to mark as active, wherein the different one of the plural alternative interpretations was previously marked as inactive.

5. The method of claim 1, further comprising:
   identifying which of the plural alternative interpretations of the particular user action is more likely to reflect an intention of a user in performing the particular user action; and
   marking, in the representation, the identified alternative interpretation as active, while remaining one or more of the plural alternative interpretations are marked inactive.

6. The method of claim 5, wherein the identifying is based on predefined rules associated with the particular user action.

7. The method of claim 5, further comprising:
   ranking the plural alternatives interpretations of the particular user action in order of likelihood that corresponding alternative interpretations of the plural alternative interpretations reflect the intention of the user in performing the particular user action.

8. An article comprising at least one non-transitory computer-readable storage medium storing instructions that upon execution cause a system having a processor to:
   receive automation code having a representation containing plural alternative interpretations of a user action made in a user interface, wherein one of the plural alternative interpretations is marked as active while another one of the plural alternative interpretations is marked as inactive; and
   execute the automation code to replay the user action using the active alternative interpretation.

9. The article of claim 8, wherein the instructions upon execution cause the system to further:
   receive a user selection to mark a different one of the plural alternative interpretations as active; and
   in response to the received user selection, mark another of the plural alternative interpretations as active and update the automation code to reflect the marked another active alternative interpretation.

10. The article of claim 9, wherein the instructions upon execution cause the system to further:
    re-execute the updated automation code to replay the user action using the marked another active alternative interpretation.

11. The article of claim 8, wherein the representation is a manipulatable model that contains information to represent the plural alternative interpretations.

12. The article of claim 11, wherein the model is in an Extensible Markup Language (XML) format.

13. The article of claim 8, wherein the user action is a first user action represented by the automation code, and wherein the automation code further represents a second user action, wherein executing the automation code causes replaying of the first and second user actions.

14. The article of claim 8, wherein executing the automation code to replay the user action does not use the inactive alternative interpretation.

15. A system comprising:
 a storage media to store a container containing information regarding plural alternative interpretations of a user action made in a user interface; and
 at least one processor to:
  identify one of the plural alternative interpretations as an active alternative interpretation, wherein execution of automation code containing the container causes replaying of the user action according to the identified active alternative interpretation;
  receive an indication to switch to another of the plural alternative interpretations as the active alternative interpretation; and
  update the container to indicate the another of the plural alternative interpretations as the active alternative interpretation;
  mark, in a representation, the another of the plural alternative interpretations as an active alternative interpretation and remaining of the plural alternative interpretations as inactive alternative interpretations; and
  present, in the user interface, the plural alternative interpretations, wherein the active alternative interpretation is indicated as being the active alternative interpretation in the user interface.

16. The system of claim 15, wherein the identifying of one of the plural alternative interpretations as the active alternative interpretation comprises determining, based on predefined rules, which of the plural alternative interpretations is more likely to reflect an intention of a user in performing the user action.

17. The system of claim 15, wherein the at least one processor is to generate the container in response to recording the user action made in the user interface during a recording session.

18. The system of claim 15, wherein execution of the automation code containing the updated container causes replaying of the user action according to another of the plural alternative interpretations.

19. The system of claim 15, wherein the container further comprises a representation of another user action made in the user interface.

* * * * *